(12) United States Patent
McErlean (10) Patent No.: US 7,024,462 B1
(45) Date of Patent: Apr. 4, 2006

(54) ELECTRONIC MESSAGE ROUTING

(75) Inventor: Patrick McErlean, Northern Ireland (GB)

(73) Assignee: Amacis Limited, Belfast (GB)

( * ) Notice: Subject to any disclaimer, the term of this patent is extended or adjusted under 35 U.S.C. 154(b) by 657 days.

(21) Appl. No.: 09/693,342

(22) Filed: Oct. 20, 2000

(51) Int. Cl.
G06F 15/16 (2006.01)

(52) U.S. Cl. ...................................... 709/207; 709/242
(58) Field of Classification Search ................ 709/207, 709/201–205, 206, 242
See application file for complete search history.

(56) References Cited

U.S. PATENT DOCUMENTS

| | | | |
|---|---|---|---|
| 5,459,717 A * | 10/1995 | Mullan et al. ............... | 370/351 |
| 5,574,903 A | 11/1996 | Szymanski et al. | |
| 5,577,202 A * | 11/1996 | Padgett ....................... | 709/206 |
| 5,765,033 A | 6/1998 | Miloslavsky | |
| 5,928,325 A | 7/1999 | Shaughnessy et al. | |
| 5,978,836 A | 11/1999 | Ouchi | |
| 6,021,427 A * | 2/2000 | Spagna et al. ............... | 709/206 |
| 6,026,396 A * | 2/2000 | Hall .............................. | 707/4 |
| 6,044,395 A * | 3/2000 | Costales et al. ............ | 709/206 |
| 6,058,435 A * | 5/2000 | Sassin et al. ................ | 719/331 |
| 6,076,101 A * | 6/2000 | Kamakura et al. .......... | 709/206 |
| 6,085,100 A * | 7/2000 | Tarnanen .................... | 455/466 |
| 6,128,646 A * | 10/2000 | Miloslavsky ................ | 709/206 |
| 6,157,941 A * | 12/2000 | Verkler et al. .............. | 709/202 |
| 6,161,130 A * | 12/2000 | Horvitz et al. .............. | 709/206 |
| 6,167,402 A * | 12/2000 | Yeager ........................ | 707/10 |
| 6,182,059 B1 * | 1/2001 | Angotti et al. ................ | 706/45 |
| 6,219,691 B1 * | 4/2001 | Youn ........................... | 709/200 |
| 6,226,666 B1 * | 5/2001 | Chang et al. ................ | 709/202 |
| 6,249,807 B1 | 6/2001 | Shaw et al. | |
| 6,260,059 B1 * | 7/2001 | Ueno et al. .................. | 709/202 |
| 6,338,081 B1 | 1/2002 | Furusawa et al. | |
| 6,356,633 B1 * | 3/2002 | Armstrong ............. | 379/265.11 |
| 6,385,619 B1 | 5/2002 | Eichstaedt et al. | |
| 6,389,132 B1 * | 5/2002 | Price ..................... | 379/265.01 |
| 6,417,930 B1 | 7/2002 | Mori | |
| 6,424,997 B1 | 7/2002 | Buskirk, Jr. et al. | |
| 6,442,592 B1 * | 8/2002 | Alumbaugh et al. ........ | 709/206 |
| 6,477,551 B1 | 11/2002 | Johnson et al. | |
| 6,477,564 B1 * | 11/2002 | Freyssinet et al. .......... | 709/202 |
| 6,493,695 B1 | 12/2002 | Pickering et al. | |
| 6,515,681 B1 * | 2/2003 | Knight ....................... | 715/751 |
| 6,519,617 B1 * | 2/2003 | Wanderski et al. ......... | 715/513 |
| 6,571,225 B1 * | 5/2003 | Oles et al. .................... | 706/12 |
| 6,571,234 B1 * | 5/2003 | Knight et al. .................. | 707/3 |
| 6,606,649 B1 * | 8/2003 | Schwitters et al. ......... | 709/206 |
| 6,629,130 B1 * | 9/2003 | Mertama et al. ............ | 709/206 |
| 6,654,735 B1 * | 11/2003 | Eichstaedt et al. ............. | 707/3 |
| 6,691,151 B1 | 2/2004 | Cheyer et al. | |
| 6,760,753 B1 | 7/2004 | Ohgushi et al. | |
| 6,769,014 B1 | 7/2004 | Chang et al. | |
| 6,801,936 B1 | 10/2004 | Diwan | |

* cited by examiner

*Primary Examiner*—Jason Cardone
*Assistant Examiner*—Thomas Duong
(74) *Attorney, Agent, or Firm*—RatnerPrestia (57) ABSTRACT

An electronic message processing system in which routing tags are used to determine how electronic messages are routed, distributed, or otherwise processed by the system. The association of a routing tag with an electronic message indicates to the system that the tagged electronic message does not need to undergo classification in order to determine how to process the message. In particular, routing tags are associated with electronic messages which have already been classified and which are subsequently sent out of the system to return at a later time. The routing tag prevents the message from having to be re-classified upon its return to the system. Reducing the number of messages that are classified, or re-classified, is advantageous since the classifiaction process, which typically involves text analysis, is a time consuming process.

23 Claims, 7 Drawing Sheets

ELECTRONIC MESSAGE ROUTING

FIELD OF THE INVENTION

The present invention relates to the field of electronic message processing. The invention relates particularly to the routing of electronic messages received by an electronic message processing system.

BACKGROUND TO THE INVENTION

Many organisations are now equipped to receive messages, including orders and enquiries, by electronic means. Typically, such electronic messages take the form of text-based messages, for example e-mails, delivered by a global computer network, for example the Internet, or by a telecommunications network, for example a mobile telephone network. Each message must be processed and dealt with appropriately i.e. according to the nature of the message. In many cases, the volume of received electronic messages is relatively high and it is considered inefficient to process each message manually.

For this reason, it is known for electronic message processing systems, typically in the form of a computer system, to employ a text analyzer, such as IBM's Mail Analyzer, to analyse the content of electronic messages in order to classify, or categorize, each message according to its content. Once a message has been categorized, the processing system sends it on to a human agent who has the capability to deal with messages falling within the relevant category(s). Alternatively, the computer system itself may be able to deal with messages falling within certain category(s). Hence, the classification information is used as routing information since the category(s) into which the message falls determine how it is routed, or distributed, within the system.

Typically, a text analyzer examines the text of each message in turn in search of one or more alphanumeric text string, for example a word or sequence of words, which may be used to identify the purpose or nature of the message under examination. Normally the text analyzer operates in association with a rule engine to apply a set of rules to the message in order to determine how to categorize the current message.

By way of simplistic example, a banking organisation may have a message processing system arranged to receive electronic messages in three different categories, namely: balance enquiry; request for funds transfer; and interest rate enquiry. In order to categorize each received message, a text analyzer in association with a rule engine applies a set of four rules to each message in turn. The first rule stipulates that if the text string "balance" appears in the message, then the message falls in the balance enquiry category. The second rule stipulates that if the text strings "funds" and "transfer" appear in the message, then the message falls in the funds transfer category. The third rule stipulates that if the message contains the text string "interest rate", then the message should be categorized as an interest rate enquiry. The fourth rule stipulates that if none of the previous rules are satisfied, then the message is deemed unclassified.

The classification of a message by a text analyzer is a relatively computationally intensive process and represents a relatively large proportion of the time taken by an electronic message processing system to process a message. The text analyzing may therefore cause a bottleneck in the operation of the message processing system.

It is desirable therefore to avoid having to subject a message to the operation of the text analyzer, if possible. For example, a customer may send a message to an organisation using a standardised electronic message submission form, such as a Web-form, that is dedicated to making a particular type of order or request e.g., a request for a funds transfer. The purpose of such a standardised message (which is sometimes known as a structured message) may be deduced from its structure. It is known for a conventional message processing system to determine the category of a received structured message by recognising the structure rather than analyzing the text of the message itself.

In the context of the present invention, it is recognised that there are other circumstances in which the category, or categories, to which a received message falls are known and that, in such circumstances, the message does not need to be subjected to text analysis. In particular, it is recognized that in some situations an electronic message, which has been received and classified by the mail processing system, may require to be sent out of the mail processing system and to return to the system at a later time. Conventionally, the message processing system treats the returning message like any other incoming message and sends it to the text analyzer for classification. This is a duplication of classification since the original message will already have been classified before having been sent out of the system.

SUMMARY OF THE INVENTION

In accordance with a first aspect of the present invention, there is provided an electronic message processing system for sending and receiving electronic messages across a network, the electronic message processing system including:
a classification module, arranged to cause said received electronic messages to be analyzed in order to determine how said received electronic messages are routed within the electronic processing system, and to assign to said received electronic messages respective routing information;
a distribution module, arranged to distribute said received electronic messages amongst a plurality of first agents depending on the respective routing information associated with each message;
at least one mail client, arranged to render to one or more of said first agents electronic messages distributed thereto, the or each mail client including:
means, responsive to an input from one of said first agents in respect of a first rendered message, for causing a second electronic message to be generated, which second electronic message includes at least part of said first electronic message;
means for generating a routing tag, which routing tag includes data for determining how said second electronic message is routed by said electronic processing system;
wherein the mail client is arranged to cause said routing tag to be included in said second electronic message and to cause said second electronic message to be sent out of said electronic processing system,
the classification module being arranged to, upon return of said second electronic message, or a derivative thereof, to said electronic processing system, to detect said routing tag in said returned electronic message and, upon detection of said routing tag, to cause said returned second electronic message, or derivative thereof, to be processed based on said data included in said routing tag.

The presence of a routing tag in a received message signals to the classification module that the message does not require classification by content analysis. The classification module is able to process the message using information included in the routing tag and can therefore bypass any time consuming content analysis classification process, particularly text analysis.

The present invention enables an electronic messaging system to avoid having to classify electronic messages by content analysis where possible, thereby reducing the overall number of messages that the text analyzer is required to process. This arrangement increases the efficiency of the electronic message processing system. The invention may also be used advantageously in relation to structured electronic messages as well as free form electronic messages.

In one embodiment of the invention, the first agents have the option to send messages out of the message processing system to be dealt with by a second, or external agent. A routing tag is associated with the message when it leaves the system and is therefore included in the reply message which the external agent sends back to the system. By detecting the routing tag in the external agent's reply message, the classifier determines that it does not need to classify the reply message by analysing its content. In this way, the use of the routing tag saves the classification module from having to re-classify the reply message as it enters the system. In this embodiment, the routing tag is preferred to include means for identifying the original message which was sent out of the system to the external agent. When the classification module extracts this information from the routing tag, it can then refer to the classification information which was determined for the original message in order to further process the received reply message and the original message. In a preferred embodiment, the routing tag takes the form of an XML tag.

It is further preferred that the original message is suspended while the system awaits a reply from the external agent. The original message is unsuspended whenever the external agents reply is received.

It is preferred that the routing tag comprises both an opening tag element and a closing tag element. This allows the routing tag to be detected with a higher degree of certainty than could be achieved using a more simplistic tag.

In an alternative embodiment of the invention, a routing tag is used in cases where an agent wishes to transfer a received message between two business units, or units, that share the same message processing system. A unit transfer message is created which includes a routing tag. The unit transfer messasge is sent out of the message processing system to return at a later time. Upon return of the unit transfer message, the classifier detects the presence of the routing tag and routes, or otherwise processes, the received unit transfer message based on the information included in the routing tag. Preferably, in this embodiment the routing tag includes an identification of the unit to which the message is to be transferred and, more preferably, an identification of an agent, or group of agents, within said unit that are capable of dealing with the message. As before, the presence of the routing tag in the unit transfer message saves the classification module from having to classify (by content analysis) the unit transfer message.

A second aspect of the invention provides a mail client for use in the system of the first aspect of the invention.

A third aspect of the invention provides a method of processing electronic messages in an electronic message processing system.

A fourth aspect of the invention provides a computer program product comprising computer program code stored on a computer usable storage medium for performing the method of the third aspect of the invention.

A further aspect of the invention provides a routing tag for use with a structured electronic message as generated by, for example, a web form.

Other aspects of the present invention will become apparent to those ordinarily skilled in the art upon review of the following description of specific embodiments of the invention and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
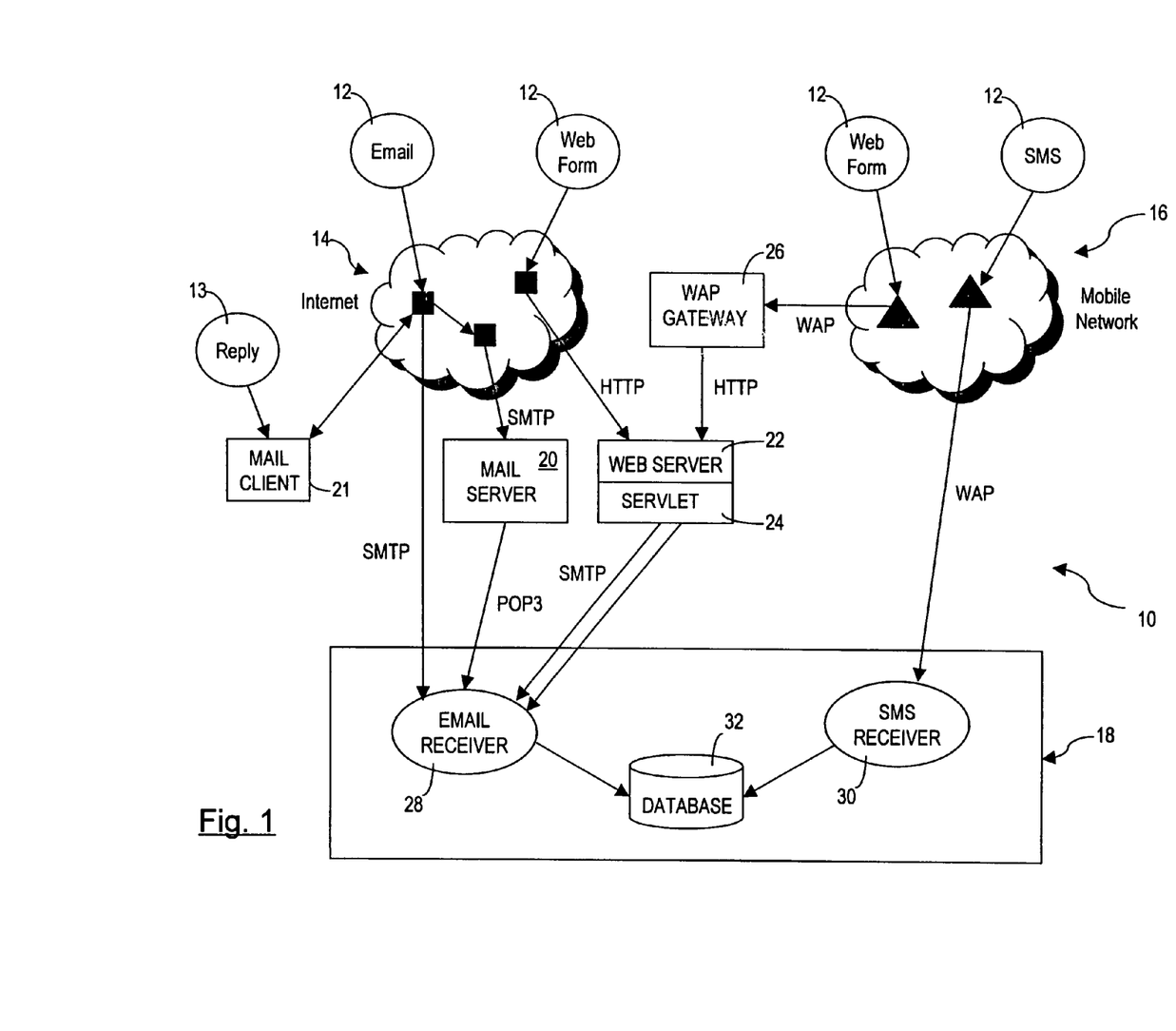
FIG. 1 is a schematic view of a communications network including a electronic message processing system.

With reference to FIG. 1 of the drawings, there is shown, generally indicated at 10, a communications network for the transmission of electronic messages 12. The network 10 includes a global computer network 14, such as the Internet, and a mobile telephone network 16 but, in general, may include any computer network and/or telecommunications network, including WAN, LAN or MAN networks. The electronic messages 12 typically take the form of, for example, e-mails, Web-page forms, SMS (Short Message Service) text messages, as commonly used by mobile telephones, or the like. It will be understood that the present invention is not limited for use with any particular such type or types of electronic messages.

The electronic messages 12 are transmitted across the communications network 10 in conventional manner using, for example, a mail server 20, Web server 22, servlet 24 and/or WAP (Wireless Application Protocol) gateway 26, as appropriate, and using conventional transmission protocols such as, WAP, HTTP (Hyper Text Transfer Protocol), SMTP (Simple Mail Transfer Protocol), POP (Post Office Protocol), or other suitable protocol. It will be understood that the invention is not limited to use with any particular transmission means or protocols.

The electronic messages 12 are received by a message processing system 18 which may reside, for example, on an organization's computer system (not shown) or an ASP's computer system (not shown). The message processing system 18 includes means for receiving electronic messages in conventional manner which, in the example of FIG. 1, includes an e-mail receiving module 28, an SMS receiving module 30 and a database 32 for storing received messages 12.

In the example illustrated in FIG. 1, the e-mail receiver 28 is arranged to receive e-mails in two ways. The first is directly from an ISP (Internet Service Provider) using SMTP, the second is via the mail server 20 using POP3. The e-mail receiver 28 is further arranged to receive Web-page form messages through the web server 22. Web-page form messages may be considered as structured e-mails which call the servlet 24 in the web server 22 which in turn converts the Web-page from content into an e-mail which is subsequently sent to the e-mail receiver 28 using SMTP.

Web-page forms from the mobile network 16 are transmitted using a WAP protocol stack to the WAP gateway 26. The WAP gateway 26 converts the Web-page form into an HTTP request, which is then processed by the web server 22 and servlet 24 as described above. SMS messaging from the mobile network 16 is conveniently transmitted using WAP to the SMS receiver 30.

Thus, the e-mail receiver 28 and the SMS receiver 30 are arranged in conventional manner to support the appropriate transmission protocols which, in the example of FIG. 1, are SMTP and POP3 for the e-mail receiver 28, and WAP for the SMS receiver.

The communications network 10 of FIG. 1 is given by way of example only to provide a typical context for the invention and is not limiting to the invention.

Figure 2:
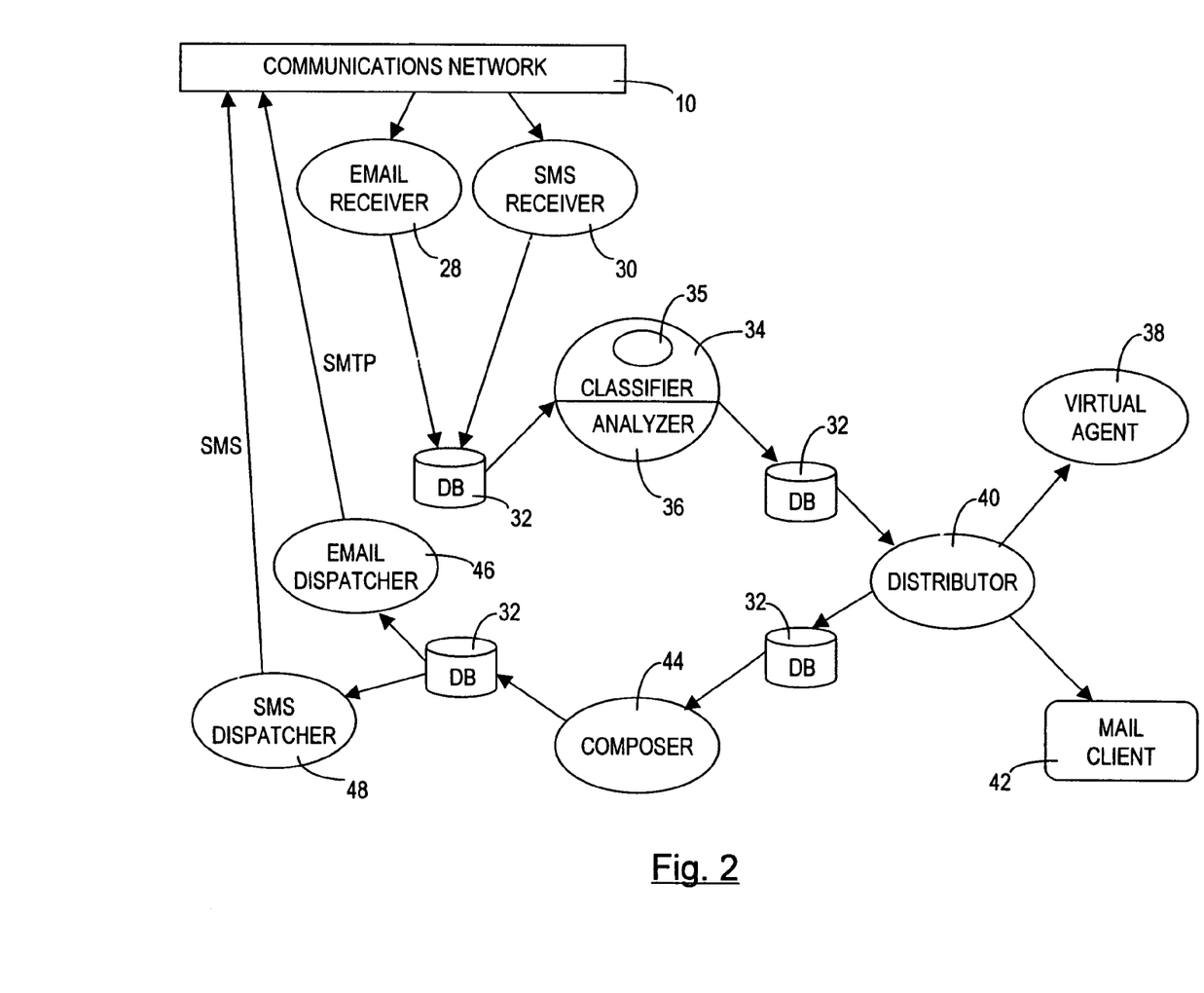
FIG. 2 is a more detailed schematic view of the electronic message processing system of FIG. 1.

Referring now to FIG. 2, the message processing system 18 is shown in more detail. Electronic messages 12 received by the e-mail receiver 28 and SMS receiver 30 are stored in database 32. A classification module 34, or classifier, retrieves each message 12 from the database 32 in turn. The primary function of the classifier 34 is to classify, or categorize, each message 12 into one or more categories depending on the content of the message 12. To this end, the classifier 34 is associated with, or includes, a text analyzer 36, for example the IBM Mail Analyzer and is further associated with, or includes, a rule engine. The classifier 34 causes received electronic messages 12 to be classified by the text analyzer 34, as is explained in further detail below.

Once classified (or categorized), each message is returned to the database 32 by the classifier 34 together with the determined classification information and, preferably, with information as to where the message should be routed in view of its classification. Conveniently, the classification information serves as the routing information since messages are routed, or distributed, to an agent depending on the (or each) class into which they are deemed to fall. For example, messages 12 falling within certain categories may require to be dealt with by a human agent (not shown) with particular skills, while messages 12 falling within other categories may be dealt with automatically by a virtual agent 38. A distributor module 40, or distributor, retrieves the categorized messages and distributes them either to the virtual agent 38 or a mail client 42, according to the respective categorization and/or routing information. The virtual agent 38 includes one or more software routines which automatically generate an appropriate response to a message 12 according to its categorization information. The mail client 42 provides the message 12 to a human operator, or agent, who then prepares an appropriate response. Once a final response is prepared, the distributor 40 marks the response as complete and causes it to be stored in the database 32. FIG. 2 shows only one mail client 42 and one virtual agent 38 although in practice there may be a plurality of each.

A composing module 44, or composer, retrieves responses from the database 32 that are marked as complete and composes a respective response message (not shown) for reply to the originator (not shown) of the respective received message 12. The composer 44 typically fulfils any attachment requirements as well as adding the appropriate Internet, or other, protocol information. Each composed response message is then returned to the database 32.

An e-mail dispatch module 46, or dispatcher, retrieves from the database 32 the composed response messages which are destined to be transmitted by e-mail and conveniently dispatches them to an ISP (not shown) using SMTP. An SMS dispatch module 48, or dispatcher, retrieves from the database 32 the composed response messages which are destined to be transmitted as SMS messages and dispatches them to the mobile network 16 using SMS protocol.

Conveniently, the modules of FIG. 2 take the form of CORBA (Common Object Request Broker Architecture) modules, or servers written, for example, in the Java programming language. Each module may reside on a single computer or may be distributed across a computer system, as is convenient. The e-mail receiver 28, SMS receiver 30, virtual agent 38, mail client 42, composer 44, e-mail dispatcher 46 and SMS dispatcher 48 are generally conventional in configuration and operation and are not limiting to the present invention.

There are two general types of electronic message which the system 18 may receive namely, a free form, or unstructured, message and a fixed form, or structured, message. A customer (not shown) who creates a free form electronic message, has control over the form and content of that message. For example, in a free form message, the customer may make a balance enquiry, request a funds transfer and also make other enquiries of his choosing. Each request is normally made in the customer's own words and phrasing.

When the message processing system 18 receives a free form message for the first time, it is necessary to subject the content of that message to text analysis in order to determine what request(s) or enquiry(s) are being made by the customer from which the message emanates. Thus, the classifier 34 causes received electronic messages 12 to be analyzed in order to determine how they are routed within the system 18, and to assign to said messages 12 respective routing information, conveniently in the form of classification information.

To this end, the text analyzer 36 applies, in conventional manner, a set of rules to the electronic message in order to determine the nature of the message. In this way, the text analyzer 36 is able to classify, or categorise, the message according to its content. Should the message comprise more than one type of request or order, then the text analyzer 36 determines that the message falls into more than one category as appropriate.

Figure 3A:
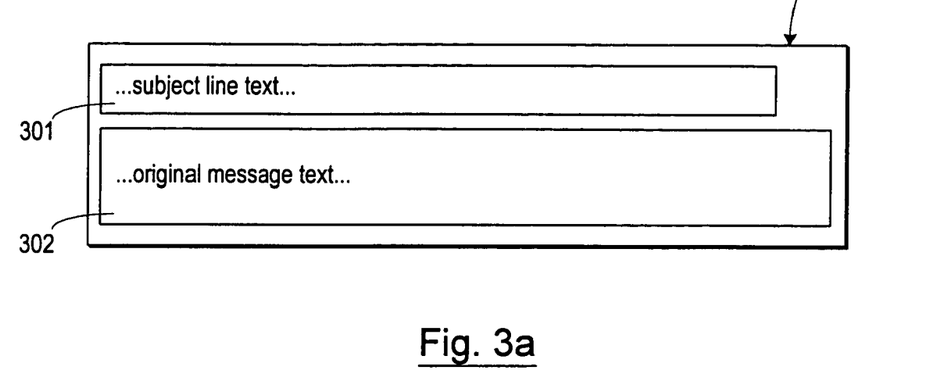
FIG. 3a is a schematic view of an electronic message for use in the electronic message processing system of the invention.

When a message has been classified, the classifier 34 causes it to be stored in the database 32. Preferably, the classifier 34 causes the component parts of the message 12 to be stored in separate respective fields in the database 32. For example, FIG. 3a shows a representation of an electronic message 12 including two component parts namely, a subject line field 301, which contains the text of the subject line of the message 12, and a message body field 302, which contains the main message text i.e. the message content. The message 12 may contain other component parts, such as the sender's address, but these are not shown for reasons of clarity.

Figure 4:
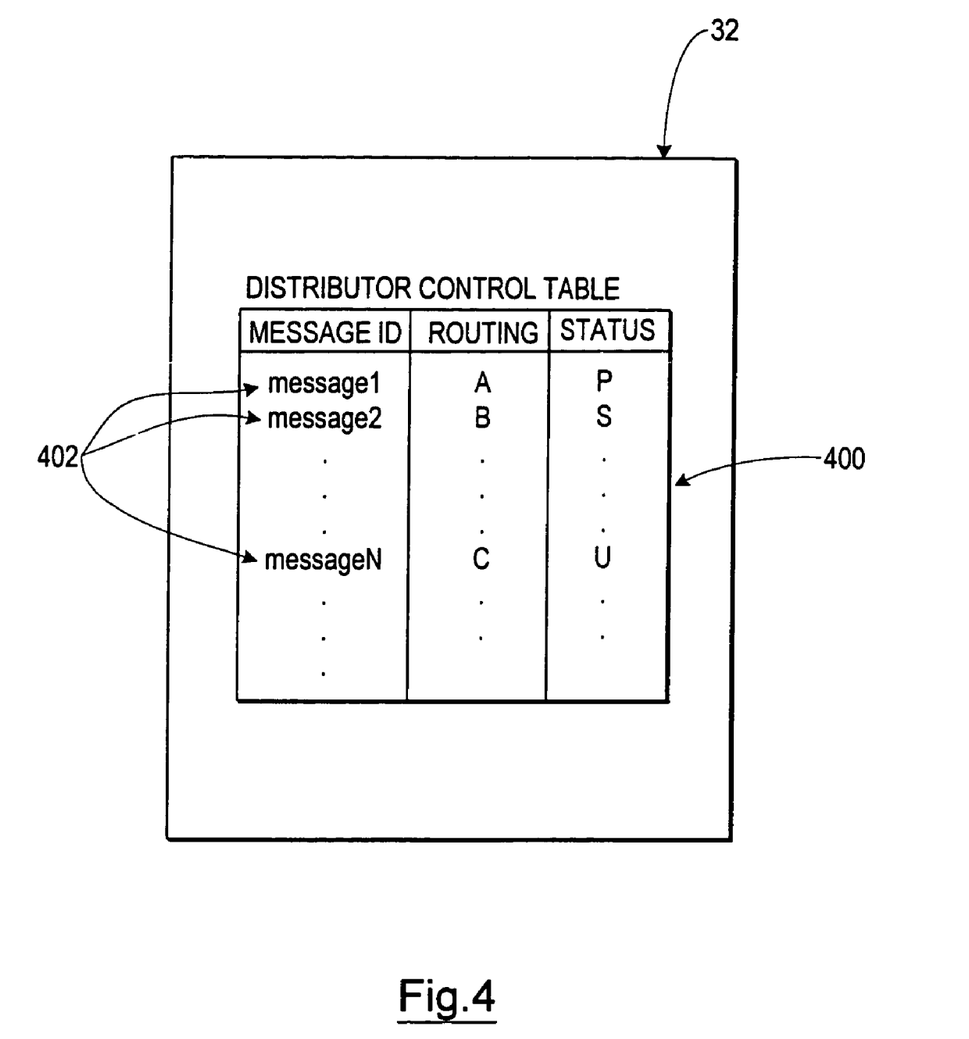
FIG. 4 is a schematic view of a distributor control table held in a database in the electronic message processing system of the invention.

With reference to FIG. 4, the database 32 also includes a distributor control table 400 which comprises a number of data records or data entries 402 each relating to messages 12 which have been received and classified and are awaiting distribution by the distributor 40. Each data entry 402 includes a message identification component (MESSAGE ID), routing information (ROUTING) and a status indicator (STATUS). Thus, when the classifier 34 classifies a message 12 and stores it in the database 32 as described above, it also creates a new corresponding entry 402 to the distributor control table 400. The distributor 40 retrieves each entry 402 in turn (or in accordance with a distribution policy) and distributes, or assigns, the corresponding message 12 to an internal agent (not shown) operating at a mail client 42, based on the routing information included in the entry 402. The routing information is conveniently related to the category(s) of the message 12 to which the entry 402 relates since the message 12 is routed or distributed to the internal agent depending on its classification and the capability of the agent.

In FIG. 4, the routing information is given as a group identifier A, B or C wherein one or more message categories are defined as belonging to a respective group A, B or C. Each internal agent is capable of dealing with one or more of said groups. For example, if a first internal agent (not shown) is capable of dealing with Group A and Group C only, then messages message1 and messageN may be routed (distributed) to him whereas message2 would have to be routed to an alternative agent (not shown) who is capable of dealing with group B. The status indicator may adopt at least 3 different states including a "processed" state (P); an "unprocessed" state (U) and "suspended" state (S).

Thus distributor 40 distributes the message to the mail client 42 of an agent (not shown) that is capable of dealing with at least one of the categories into which said message is deemed to fall. In general, the distributor 40 distributes received electronic messages amongst a plurality of agents depending on the respective routing information associated with each message and on the capability of the agents. The (or each) mail client 42 is arranged to render messages 12 to the agent so that the agent can respond to the message 12 as best he can.

The operation of the text analyzer 36 on a message 12 is computationally intensive and it accounts for a relatively high proportion of the overall processing to which a message is subjected by the message processing system 18. The text analyzer 36 can therefore cause a bottleneck in the message processing system 18. It is desirable therefore to avoid having to send a message 18 to the text analyzer 36 if possible.

To this end, and in accordance with the present invention, a routing tag, or identification tag, is associated with each message that either does not require classification by content analysis (for example a structured message such as a web-form) or which has already been classified by the text analyzer 36 and which requires to be sent out of the system 18 to return at a later time. The classifier 34 is arranged, upon recognition of a routing tag, to cause the associated message to be distributed by the distributor 40, or otherwise processed, without first sending it to the text analyzer 36, i.e. the classifier 34 may select to bypass the text analysis stage. The invention is described below in the context of three example cases namely:

(i) An external agent case, in which a message is sent out of the system 18 for processing by an expert or external, agent;

(ii) A unit transfer case, where a message is sent out of the system 18 in order to transfer the message between different units of an organisation; and (iii) A web-form case, where a structured message, generated from a dedicated, web-form, is received by the system.

Considering first the external agent case, the internal agent may determine that he is not able to deal with one or more aspects of a message 12 that has been distributed to him. In this case, the agent may select to send the message to an external agent (not shown), outside of the message processing system 18, who has the capability of dealing with at least one of outstanding aspect(s) of the message.

Figure 3B:
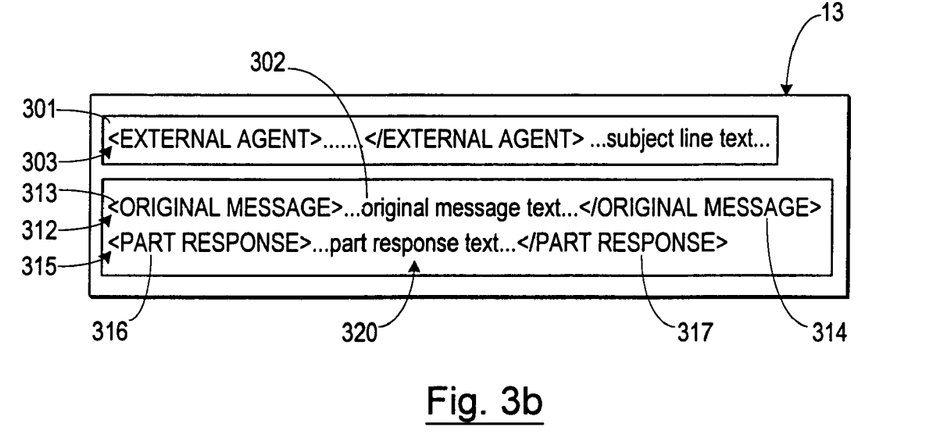
FIG. 3b is a schematic view of an external agent message for use in the electronic message processing system of the invention.

Referring now to FIG., 3b, if the internal agent selects, at his mail client 42, to send the message to an external agent, the mail client 42 is arranged to cause a second, or external agent, message 13 to be composed which includes an external agent routing tag 303, at least part of the original message text i.e. the content of the original message body 302 from the customer and, preferably, a part-response 320 (if any) that has already been prepared by the internal agent at mail client 42.

Figure 5A:
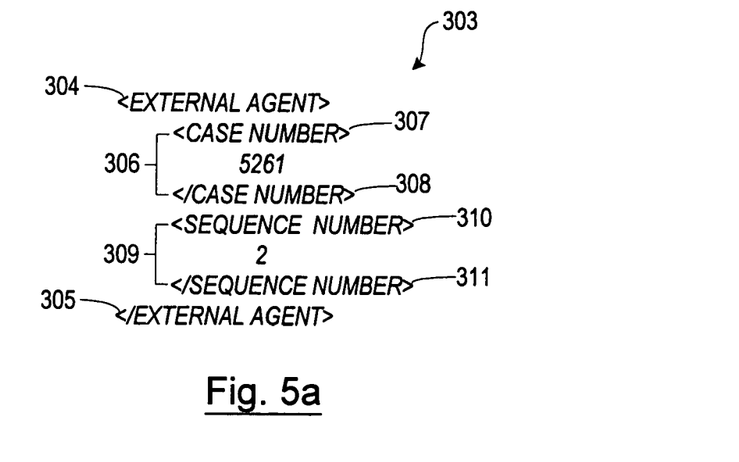
FIG. 5a is an example of an external agent routing tag.

FIG. 5a shows an example of a suitable external agent routing tag, generally indicated at 303. The routing tag 303 comprises an opening tag element <EXTERNAL AGENT> 304 and a closing tag element </EXTERNAL AGENT> 305 for delimiting respectively the beginning and the end of the routing tag 303. Between the opening tag element 304 and the closing tag element 305, the external agent routing tag 303 preferably includes means for identifying the message 12 which is to be sent to the external agent. In the example of FIG. 3a, this is achieved by the inclusion of two further tags, or sub-tags, namely a case number tag 306 and a sequence number tag 309, each having their own respective opening and closing tag elements 307, 308 and 310, 311. In the example, it is assumed that each message 12 has an associated case number and sequence number, which uniquely identify that message 12. The case number and sequence number are respectively included between the opening and closing case number tag elements 307, 308 and the opening and closing sequence number tag elements 310, 311. It will be appreciated that there are many other ways of identifying a message without the need for a case number and/or a sequence number. For example, in an alternative embodiment, the external agent routing tag 303 may simply include a number or alphanumeric string for identifying the message. Further, the particular tag structure illustrated in FIG. 3a is not essential. It is however preferred to use both an opening tag element and a closing tag element as this arrangement allows the routing tag to be detected with a higher degree of certainty than if only, say, an opening tag element was used. The mail client 42 is arranged to generate the routing tag 303 and to this end conveniently stores the required information for creating the tag (which in the present example is the case and sequence number of the message 12) in local memory.

In general a routing tag may contain any information which allows the message with which the tag is associated to be routed, distributed, or otherwise processed, without having to undergo text analysis, or a similar classification process. In a simple example, a routing tag (not shown) may include information identifying one or more message classes into which the message is deemed to fall.

Conveniently, an XML (extensible Mark-up Language) data format or syntax is used to define the tags.

Referring again to FIG. 3, when the mail client 42 receives an input, or request, from the internal agent to send a message 12 to an external agent externally of the system 18, the mail client 42 causes an external agent message 13 to be created. The mail client 42 generates an external agent routing tag 303 and includes the routing tag 303 in the expert agent message 13. Conveniently, the mail client 42 causes the external agent routing tag 303 to be inserted into the subject line field 301 in the database 32 and thereby included in the subject line of the expert agent message 13. The mail client 42 retrieves the body 302 of the original customer message 12 from the appropriate field in the database 32 and includes it in the external agent message 13. If the internal agent has made a part response 320 to the message, then the mail client 42 also includes the part response 320 in the expert message 13. Preferably, the body 302 of the original message 12 and the part response 320 are enclosed within, or associated with, respective identification tags which, in FIG. 4, are shown as an original message tag 312 and a part response tag 315. The original message and part response tags 312, 315 include respective opening and closing tag elements 313, 314 and 316, 317 and are conveniently created in the XML data format. The mail client 42 causes the expert agent message 13 to be stored in the database 32 together with an identification of the external agent to which the message 13 is to be sent.

The distributor 40, upon recognition of an external agent message 13 creates a copy of the external agent message 13 and causes said copy to be sent to the external agent in conventional manner by the composer 44 and, for example, the e-mail dispatcher 46. Conveniently, in order that the distributor 40 may recognise an expert agent message, the mail client 42 includes a flag (not shown) or other indicator for indicating to the distributor that the message with which it is associated i.e. the external agent message 13 needs to be forwarded externally of the e-mail processing system.

The distributor 40 also refers to the distributor control table 400 and marks the distributor control table entry 402 which corresponds to the original customer message 12 as suspended. In the example of FIG. 4, this is indicated by means of the letter 'S' in the status column of the distributor control table 400.

Figure 3C:
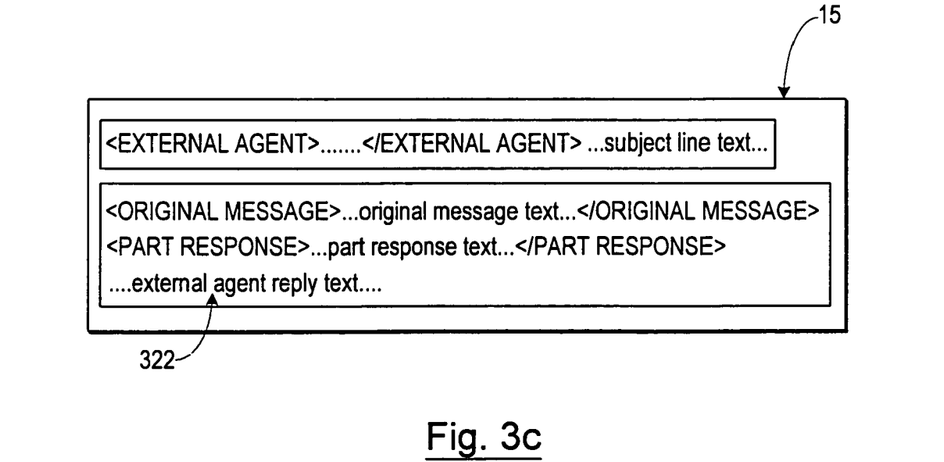
FIG. 3c is a schematic view of an external agent reply message for use in the system of the present invention.

The system 18 transmits the external agent message 13 to the appropriate external agent in conventional manner. By way of example, and with reference to FIG. 2, the external agent (not shown) may operate from an external mail client 21 which is in communication with the system 18 across the Internet 14. Upon receipt of the external agent message 13, the external agent prepares a reply to those aspect(s) of the original message 12 that he can and which have not already been dealt with by the internal agent. With reference to FIG. 3*c*, the external agent creates an external agent reply message 15 by inserting his reply into the external agent message 13. Conveniently, the reply takes the form of an alphanumeric string 322 inserted into the field of the external agent message 13 that holds the body 302 original message 12 and the part response 320 (if any). The external agent then transmits the external agent message 400, including his reply, back to the message processing system 18.

The message processing system 18 receives the message 400 returned from the external agent in normal manner and it is stored in the database 32 to await classification by the classifier 34.

Figure 6:
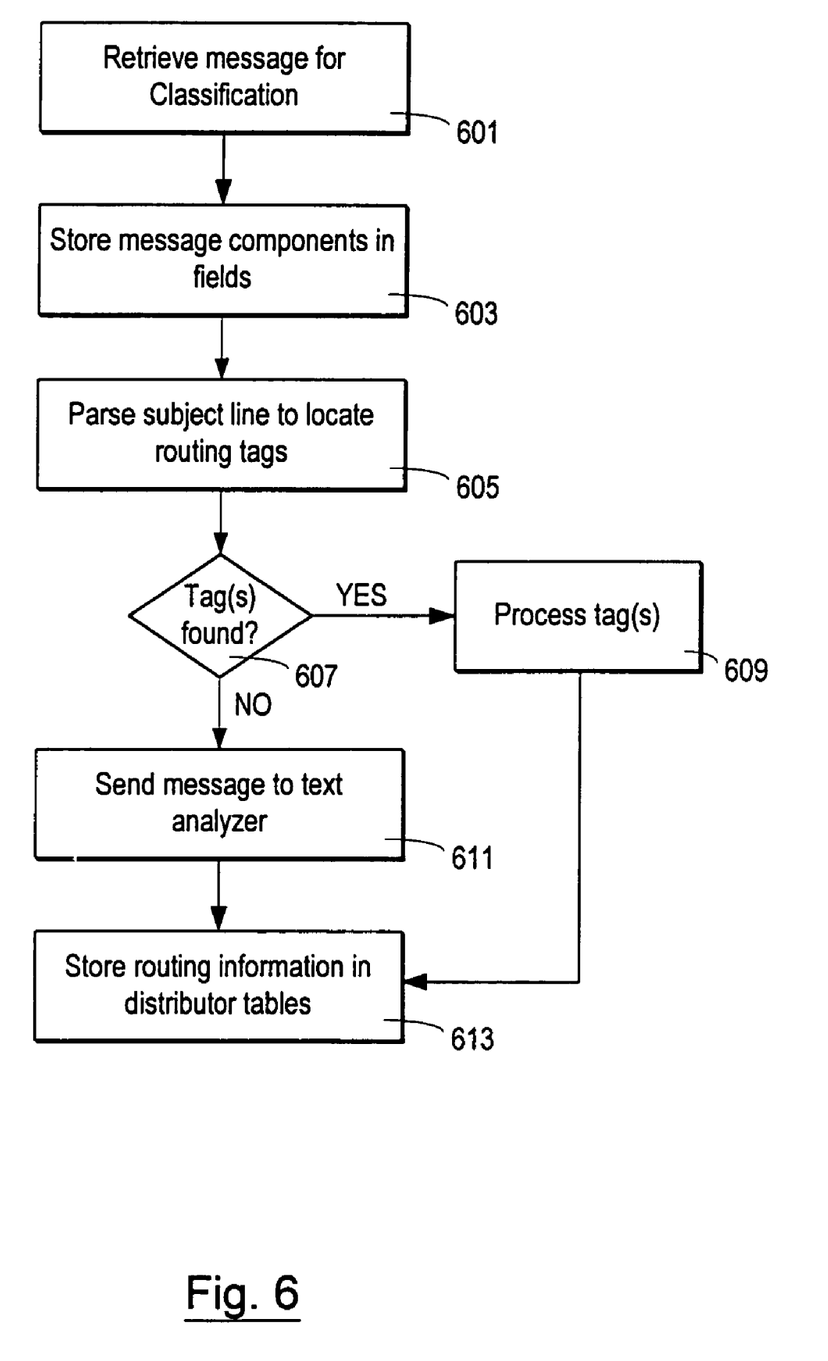
FIG. 6 is a flow diagram of the operation of a classification module in accordance with the present invention.

The operation of the classifier 34 is now described with reference to FIG. 6. At module 601, the classifier 34 retrieves a received message 12 (which may or may not be an external agent reply message 15) from the database 32 for classification. At module 603, the classifier preferably causes the different component parts of the message 12 to be stored in separate fields in the database 32. For example, the subject line of the message is stored in a first field, the sender's address is stored in a second field, the main body of the message 12 is stored in a third field and so on.

The classifier 34 includes, or is associated with, a parser in the form of an alphanumeric string parser 35. The parser 35 is arranged to detect the presence of a routing tag 303, a sub-tag 306, 309 or an identification tag 312, 315 in a received message 12. In general, the parser 35 is arranged to detect tags which exhibit a specified format which, in the present example, is an XML format (although the parser 35 need not necessarily be an XML parser.) At module 605, the parser 35 is arranged to detect in particular a routing tag 303 and, if applicable, a sub-tag, for example a case number tag 306 and a sequence number tag 309, in the current message 12 being classified. Since the mail client 42 is arranged to include the external agent routing tag 303 in the subject line of field of the external agent message 13, the parser 35 examines the subject line field 302 of the message 12 being classified in search of, in the first instance, a routing tag 303.

The parser 35 signals to the classifier 34 that a routing tag 303 is detected only if the parser 35 detects both a valid opening tag element 304 and a valid closing tag element 305. Should a valid opening tag 304 be detected, the parser conveniently stores the following portion of the subject line of field in local memory in anticipation of identifying a valid closing tag element 305.

At module 607, if a routing tag 303 is not found, it is assumed that the message 12 requires classification by content analysis and then the classifier proceeds to module 611 wherein the message 12 is sent to the text analyzer 36 for classification in the normal manner.

Once classification is complete under module 611, the classifier 34 proceeds to module 613 wherein the classifier 34 creates an entry to the distributor control table 400 in normal manner. Typically, the distributor control table entry 402 will include a message identifier, routing information and status information—the latter normally indicating that the message 12 is unprocessed i.e. awaiting distribution.

If, at module 607, the classifier 34 determines that a routing tag 303 is present in the subject line of the message 12, then the classifier 34 proceeds to module 609 to process the routing tag 303.

At module 609, the parser 35 examines, or parses, said conveniently stored portion of the subject line field in order to extract a message identification therefrom. In the present example, this involves extracting both a case number and a sequence number from a respective case number tag 306 and sequence number tag 309. As before, the parser 35 only detects a valid case number or sequence number tag 306, 309 if both of the respective opening and closing tag elements 307, 308 and 310, 311 are validly detected. When a valid case number opening tag 307 is detected, the parser 35 conveniently stores the following alphanumeric string (which in the example of FIG. 3*a* is "5261") in a program variable assigned to store the case number. Similarly, when a valid sequence number opening tag is detected, the following alphanumeric string (which is "2" in FIG. 3*a*) is stored into a program variable allocated to sequence number. With the respective value for case number and sequence number so stored, the classifier 34 has means for identifying the original message 12 to which the external agent reply 15 relates.

Thus, the classifier 34 has determined that the current message that it is processing is an external agent reply message 15 (by detection of the external agent routing tag 303) and has also determined to which original message 12 said external agent reply message 15 relates. The classifier 34 does not therefore need to send the current message to the text analyser 36 for classification since classification will have been performed when the original message 12 first entered the system 18. The classifier 34 therefore selects to bypass the text analysis stage of the message processing. Thus the external agent reply message 15 is processed by the system 18 according to the information included in the external agent routing tag 303.

Also at module 609, the parser 35 searches for the reply text 322 that was repaired by the external agent. To this end, the parser 35 retrieves from the database 32 the body 302 of the current message 12 which, since the current message 12 is an external agent reply message 15, comprises the original message text wrapped in an original message identification tag, a part response, wrapped in a part response identification tag, and the actual reply text 322 prepared by the external agent. The parser 35 identifies to the classifier 34 the external agent's reply text as the portion of the message body 302 that is not wrapped in an identification tag. The classifier 34 then concatenates the identified external agent reply text 322 with the part response text 320 that was prepared by the internal agent before the original message 12 was sent to the external agent. As described above, the part response text 320 is stored in the database 32 by the distributor 40 before the external agent message 13 is sent out of the system 18. Using the determined case number and sequence number to identify the appropriate storage location in the database 32, the classifier 34 causes the external agent's reply text 322 to be included with the part response text 320 in the database 32.

The classifier 34 then proceeds to module 613 in order to update the distributor control table 400. A distributor control table entry 402 already exists in respect of the original message 12 but it exists in a suspended state as described above. At module 613, therefore, the classifier 34 reactivates, or unsuspends, the relevant distributor control table entry 402. The distributor control table 402 is then treated by the distributor 40 as any other distributor control table entry 402 and is distributed to an internal agent in due course.

The reactivated distributor control table entry 402 may be distributed to any internal agent with the capability of dealing with the corresponding message 12. In a preferred embodiment, the reactivated message 12 is distributed to the same internal agent who caused it to be sent to the external agent. To this end, the external agent routing tag 303 includes a further sub-tag (not shown) for identifying said internal agent and the classifiers, in conjunction with the string parser, is arranged to recognise said further sub-tag and to cause the reactivated message to be distributed, or routed, to him.

Considering now the unit transfer case, it is not uncommon for more than one organisation, or more than one divisions or units of the same organisation, to use a common electronic message processing system 18. Typically, the respective organisations/units are served by the same receiver modules 28, 30 classifier 34, distributor 40, composer 44 and dispatcher 46, 48, but each may, or may not, have respective virtual agents 38 and internal agents operating at mail clients 42. The database 32 is typically portioned into segments, each organisation/unit being allocated one or more segments.

Particularly in the case where one or more units (not shown) of the same organisation are sharing a system 18, there is a requirement from time to time to transfer electronic messages 12 from one unit to another. It is relatively complicated to achieve this transfer internally of the system 18. It is preferred to send a message 12, which was received by the system 18 in respect of a first unit, out of the system 18 and to arrange for said message 12 to return to the system 18 destined for a second unit.

In accordance with the present invention, a routing tag is associated with said message 12 before it is sent out of the system 18 in order to avoid reclassification of the message 12 by the text analyzer 36 upon its return to the system 18.

A customer message 12 is received by the system 18 and is distributed to an internal agent (not shown) who is associated with a first unit (not shown) of the organisation that operates the system 18. The internal agent may decide that all or part of the message 12 does not relate to the first unit and may therefore select to transfer the message 12 to another unit. There are a number of reasons why a message 12 may be sent to an inappropriate unit. For example, the customer who sends the message 12 may simply have addressed it incorrectly. Alternatively, the classification of the message 12 by the classifier 34 and text analyzer 36 may be inaccurate. Alternatively still, the classification of the message 12 may have been indeterminate in which case the message 12 is sent to a default internal agent who makes a decision how to distribute the message 12 further.

Figure 7:
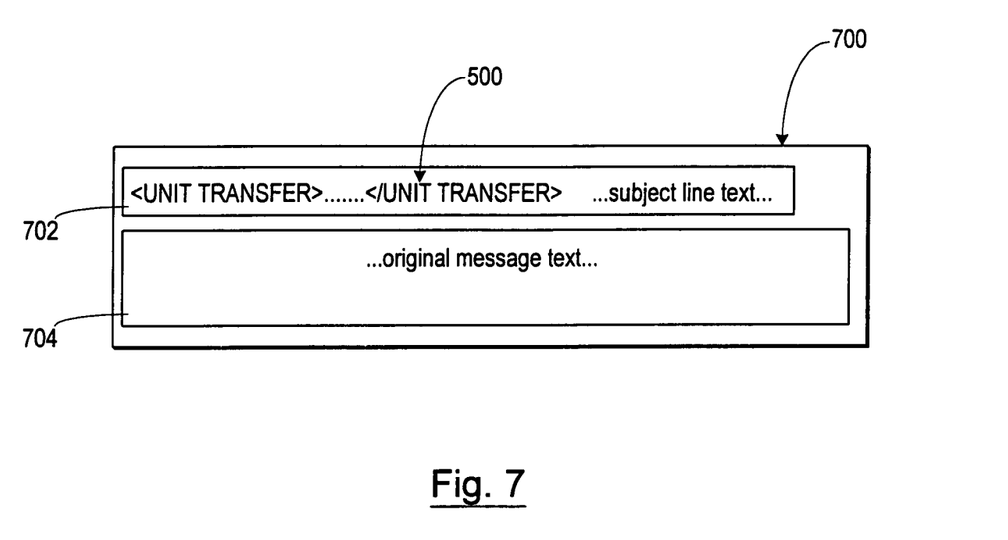
FIG. 7 is a schematic view of a unit transfer message for use in the electronic message processing system of the present invention.

Should the internal agent select to perform an inter-unit transfer, the mail client 42 is arranged to prepare a unit transfer message. FIG. 7 illustrates schematically an example of an inter unit transfer message 700. The unit transfer message 700 is shown comprising two fields namely, a subject line field 702 and a message body field 704. The original message text is stored in the message body field 704 of the unit transfer message 700.

The mail client 42 includes a unit transfer routing tag 500 in the unit transfer message 700. Conveniently, the unit transfer routing tag 500 is inserted into the subject line field 702 of the unit transfer message 700.

Figure 5B:
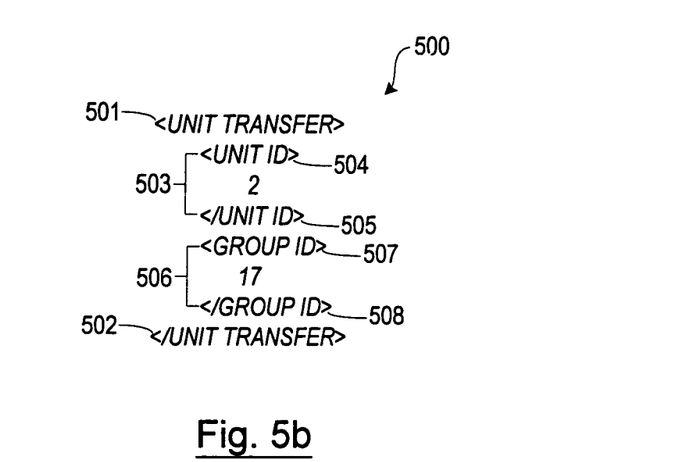
FIG. 5b is an example of a unit transfer routing tag.

FIG. 5b shows an example of a suitable unit transfer routing tag 500. The unit transfer routing tag 500 includes an opening tag element 501 and a corresponding closing tag element 502. Between the opening and closing tag elements 501, 502, the unit transfer routing tag 500 includes means for identifying the unit to which the unit transfer message 700 is to be delivered. Preferably, the unit identification means includes a unit ID sub-tag 503 comprising an opening tag element 504 and closing tag element 505. The unit ID tag 503 includes identification of the unit to which the unit transfer message 700 is to be sent. Conveniently, the unit identifying means includes an alphanumeric string (which in FIG. 5b is "2"). Preferably, the unit transfer routing tag 500 further includes a group identification sub-tag 506 having respective opening and closing tag elements 507, 508. The group identification tag 506 includes an identifier 509 for identifying a group or sub-group within a unit wherein one or more internal agents are associated with each group, or sub-group. Thus, in the example of FIG. 5b, the unit transfer routing tag 500 identifies that the unit transfer message 700 is to be routed or distributed to group 17 of unit 2. Optionally, the unit transfer routing tag 500 further includes an agent identification tag (not shown in FIG. 7) for identifying a particular agent (not shown) in (in the present example) Group 17. Conveniently, the unit transfer routing tag 500 has an XML format.

The structure of the unit transfer routing tag 500 shown in FIG. 5b is not limiting. For example, in a simplistic embodiment, the unit transfer routing tag may include only a simple alphanumeric string between the opening and closing tag elements 501, 502 for identifying the unit to which a message is to be transferred. Alternatively, if the internal agent who initiates the unit transfer can identify an agent within another unit to which a message should be transferred, then the mail client is arranged to accept identification of an agent from said internal agent and to include this information in the unit transfer routing tag—for example wrapped in a further sub-tag (not shown).

Once the mail client 42 has composed a suitable unit transfer routing tag 500, the mail client 42 includes the composed unit transfer routing tag 500 in the unit transfer message 700, conveniently in the subject line field 702. The mail client 42 then returns the unit transfer message 700 to the database 32 indicating to the distributor that it is to be sent out of the system 18.

The distributor 40 causes the unit transfer message 700, saving the original message 700 or a copy thereof to be sent out of the system 18. The distributor 40 then refers to the distributor control table 400 and marks the entry 402 that corresponds to the original customer message 12 as being terminated i.e. completed or processed. Thus, the system 18 in so far as it relates to the first unit, takes no further action in relation to the original message 12 in so far as it relates to another unit. In some cases, the original message 12 may fall within several categories, some of which are capable of being dealt with within the unit that received the message 12 (and for which an unit transfer is therefore not required) and others which cannot be dealt with by the receiving unit and for which a unit transfer is required. In this event, the internal agent(s) of the receiving unit deal with those aspects of the original message 12 that they can and cause a response to be sent back to the customer in normal manner. Thus, there may be more than one entry 402 in the distributor control table relating to the message 12 and, when sending out a unit transfer message 700, the distributor 40 only marks as terminated those entries 402 which relate to aspects of the message 12 which cannot be dealt with within the current unit.

Clearly, an internal agent may cause more than one unit transfer message 700 to be created depending on the diversity of the content of the original message 12.

The unit transfer message 700 is set out of the system 18 in conventional manner. As it retains the same mail address as it originally carried (i.e. the one assigned to it by the customer from which it emanated). The unit transfer message 700 returns to the system 18, for example via the Internet 14, and is again received by either the e-mail receiver 28 or the SMS receiver 30, as appropriate. The incoming unit transfer message 700 is treated like any other incoming message 12 and is stored in the database 32.

The classifier 34 processes the received unit transfer message 700 in turn according to the modules described with reference to FIG. 6. At module 609, the classifier 34, in conjunction with parser 35, detects the presence of the unit transfer tag 500. The parser 35 is further arranged to search for the unit ID sub-tag 503 and, when the unit ID tag 503 is located, to store the contents of the tag 503 in a suitable program variable. Similarly, where the unit transfer routing tag 500 includes a group ID sub-tag 506, the parser 35 is arranged to store the contents of the group ID tag 506 into a suitable program variable. Thus, the classifier 34 has determined that the current message 12 which it has retrieved for classification is a unit transfer message 700 and has also determined the unit, and group within that unit, to which the message is destined.

The classifier 34 then causes the unit transfer message 700 to be stored in the segment of the database 32 that is associated with the identified unit. Where group (and/or agent) identification information has been extracted from the unit transfer tag 700, the classifier 34 is also able to provide the distributor 40 with routing information as to where the received unit transfer message 700 should be routed. Where group identification information is not available, then the classifier 34 may cause the message 700 to be routed to a default internal agent associated with said identified unit.

When the classifier 34 establishes that a received message 12 is a unit transfer message 700, the received message 12 is assigned a new case number appropriate to the unit to which message 12 is being transferred. The original message text is stored in association with the newly created case number. The classifier 34 then creates an entry into the distributor control table 400 for the new case using the new case number as a message identifier and using the information provided in the unit transfer routing tag 500 as routing information. The message 12 is then routed in normal manner by the distributor 40.

Thus, the classifier 34, having determined that the message 12 which it retrieves from the database 32 for classification is a unit transfer message 700, does not send the message 700 to the text analyzer 36 for classification. Rather, the message 700 is routed, or distributed, to an internal agent on the basis of the information contained within the unit transfer routing tag 500.

Figure 5C:
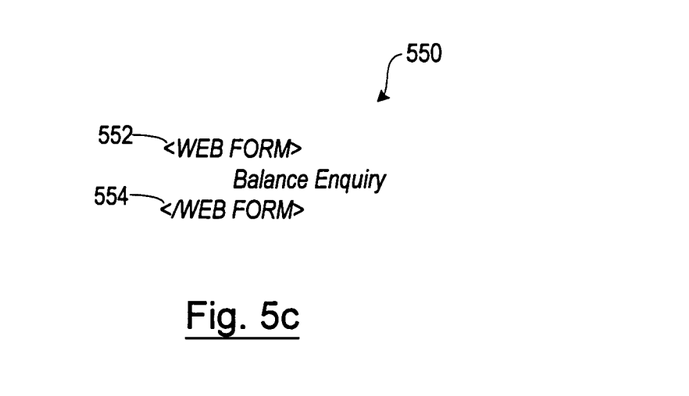
FIG. 5c is an example of a webform routing tag.

The external agent case and the unit transfer case as outlined above relate primarily to received messages which are free form, or unstructured, in nature. The present invention is also applicable, however, to received messages 12 of a structured nature—for example, messages 12 which emanate from a web-form. In accordance with a further aspect of the invention, a web-form routing tag is associated with each message 12 that is generated from a web-form, or other structured message. FIG. 5c illustrates an example of a suitable web-form routing tag 550. As before, the web-form routing tag 550 preferably includes both an opening tag element 552 and a closing tag element 554 which are conveniently constructed using an XML format. The web-form routing tag 550 includes means for identifying the type or nature of request or order being made by a customer by submission of the corresponding web-form. In the example of FIG. 5c the web-form routing tag 550 is constructed for association with a web-form for making a balance enquiry and hence includes, between the opening and closing tag elements 552, 554, an alphanumeric string which identifies the received message 12 as a balance enquiry. Typically, when a customer submits a request or order via a web-form, the request or order is converted into an e-mail message 12. Conveniently, therefore, the web-form routing tag 550 is included in the subject line of the e-mail message 12 generated from the web-form. Clearly, the web-form routing tag 550 may be included into the e-mail message 12 in any other convenient manner.

Thus, when the e-mail message 12 including the routing tag 550 is received by the message processing system 18 and sent to the classifier 34 for classification, the classifier 34 detects the web form routing tag 550 thereby determining that the e-mail message 12 emanates from a web form and does not require to undergo text analysis. The type of nature of the received e-mail message 12 is deduced by the classifier from the content of the web form routing tag 550. The classifier 34 causes the received e-mail message 12 to be routed, or otherwise processed, according to the information contained in the routing tag 550.

The invention is described above in the context of a simple banking organization. It will be appreciated, however, that the invention is equally suitable for application other fields.

The invention is not limited to the embodiments described herein, which may be modified or varied without departing from the scope of the invention.

What is claimed is:

1. An electronic message processing system for sending and receiving electronic messages across a network, the electronic message processing system including:
   a classification module, arranged to cause said received electronic messages to be analyzed in order to determine how said received electronic messages are routed within the electronic processing system, and to assign to said received electronic messages respective routing information;
   a distribution module, arranged to distribute said received electronic messages amongst a plurality of first agents depending on the respective routing information associated with each message;
   storage means, arranged to store received electronic messages in association with respective means for uniquely identifying each received message; and
   at least one mail client, arranged to render to one or more of said first agents electronic messages distributed thereto in order that said one or more first agents may prepare an appropriate response message to at least part of an electronic message rendered thereto, the or each mail client including:
   means, responsive to an input from one of said first agents in respect of a rendered first electronic message, for causing a second electronic message to be generated, said second electronic message being other than a response message to said rendered first electronic message and including at least part of said first electronic message;
   means for generating a routing tag, which routing tag includes the respective unique message identifying means associated with said first electronic message;
   wherein the mail client is arranged to cause said routing tag to be included in said second electronic message and to cause said second electronic message to be sent out of said electronic processing system,
   the classification module being arranged, upon return of said second electronic message, or a derivative thereof, to said electronic processing system, to detect said routing tag in said returned electronic message and, upon detection of said routing tag, to cause said returned second electronic message, or derivative thereof, to be processed based on said data included in said routing tag, wherein said processing includes associating, by means of said respective unique message identifier included in said routing tag, said returned second electronic message, or derivative thereof with said first electronic message stored in said storage means, and
   wherein the association between the returned second electronic message, or derivative thereof, and the first electronic message stored in said storage means causes, upon generation of a response message to said first electronic message by said at least one mail client, any response text generated by said one first agent in respect of said first electronic message and any response text included in said returned second electronic message, or derivative thereof, to be included in said response message.

2. An electronic message processing system as claimed in claim 1, wherein said routing tag includes means for identifying an agent, or group of agents, associated with said electronic processing system.

3. An electronic message processing system as claimed in claim 1, wherein said routing tag includes means for identifying a class into which said first electronic message is deemed to belong.

4. An electronic message processing system as claimed in claim 1, wherein said routing tag comprises an opening tag element and a closing tag element for delimiting respectively the beginning and the end of the routing tag.

5. An electronic message processing system as claimed in claim 4, wherein the routing tag includes one or more sub-tags, each sub-tag including respective data concerning the first or second electronic message.

6. An electronic message processing system as claimed in claim 4, wherein said routing tag is constructed according to an XML (extensible Mark-up Language) format.

7. An electronic message processing system as claimed in claim 1, wherein the mail client is arranged to cause the second electronic message to be sent to a second agent across said network, said second agent operating externally of said electronic message processing system.

8. An electronic message processing system as claimed in claim 1, wherein the mail client is arranged to cause the second electronic message to return to the electronic message processing system.

9. An electronic message processing system as claimed in claim 1, wherein said at least part of said first electronic message included in said second electronic message is associated with an identification tag.

10. An electronic message processing system as claimed in claim 1, wherein said second electronic message further includes a response, created by said first agent, to at least part of said first electronic message.

11. An electronic message processing system as claimed in claim 10, wherein said response is associated with an identification tag.

12. An electronic message processing system as claimed in claim 1, wherein the routing tag is included in the subject line of said second electronic message.

13. An electronic message processing system as claimed in claim 1, wherein said routing tag comprises an alphanumeric string and said classification module is associated with an alphanumeric string parser.

14. An electronic message processing system as claimed in claim 1, wherein said mail client, in response to the creation of said second electronic message, is arranged to cause said first electronic message to be suspended and, in response to detection of said routing tag in said returned second electronic message, said classification module is arranged to cause said first electronic message to be unsuspended.

15. An electronic message processing system as claimed in claim 1, wherein said mail client, in response to the creation of said second electronic message, is arranged to terminate the processing of said first electronic message.

16. In an electronic message processing system for sending and receiving electronic messages across a network, the electronic message processing system being arranged to store received electronic messages in association with respective means for uniquely identifying each received message and to distribute received electronic messages amongst a plurality of first agents, a method of processing received electronic messages, the method comprising:

rendering to one of said first agents a first electronic message in order that said first agent may prepare an appropriate response to at least part of the rendered first electronic message;

causing a second electronic message to be generated, said second electronic message being other than a response message to said rendered first electronic message and including at least part of said first electronic message;

generating a routing tag, which routing tag includes the respective unique message identifying means associated with said first electronic message;

causing said routing tag to be included in said second electronic message;

causing said second electronic message to be sent out of said electronic processing system;

detecting, upon return of said second electronic message, or a derivative thereof, to said electronic processing system, said routing tag in said returned electronic message;

causing, upon detection of said routing tag, said returned second electronic message, or derivative thereof, to be processed based on said data included in said routing tag, wherein said processing includes associating, by means of said respective unique message identifier included in said routing tag, said returned second electronic message, or derivative thereof, with said first electronic message; and upon generation of a response message to said first electronic message by said at least one mail client, including any response text generated by said one first agent in respect of said first electronic message and any response text included in said returned second electronic message, or derivative thereof, in said response message.

17. A method as claimed in claim 16, further including causing the second electronic message to be sent to a second agent across said network, said second agent operating externally of said message processing system.

18. A method as claimed in claim 16, further including causing the second electronic message to return to the electronic message processing system.

19. A method as claimed in claim 16, further including causing, in response to the creation of said second electronic message, said first electronic message to be suspended; and causing, in response to detection of said routing tag in said returned second electronic message, said first electronic message to be unsuspended.

20. A method according to claim 16, further including causing, in response to the creatior of said second electronic message, the processing of said first electronic message to be terminated.

21. A computer program product comprising computer program code stored on a computer usable storage medium for, when executed on a computer system, processing electronic messages in an electronic message processing system for sending and receiving electronic messages across a network, the electronic message processing system being arranged to store received electronic messages in association with respective means for uniquely identifying each received message and to distribute received electronic messages amongst a plurality of first agents, said computer program code being arranged to implement a method, which method comprises:

rendering to one of said first agents a first electronic message in order that said first agent may prepare an appropriate response to at least part of the rendered first electronic message;

causing a second electronic message to be generated, said second electronic message being other than a response message to said rendered first electronic message and including at least part of said first electronic message;

generating a routing tag, which routing tag includes the respective unique message identifying means associated with said first electronic message;

causing said routing tag to be included in said second electronic message;

causing said second electronic message to be sent out of said electronic processing system;

detecting, upon return of said second electronic message, or a derivative thereof, to said electronic processing system, said routing tag in said returned electronic message;

causing, upon detection of said routing tag, said returned second electronic message, or derivative thereof, to be processed based on said data included in said routing tag, wherein said processing includes associating, by means of said respective unique message identifier included in said routing tag, said returned second electronic message, or derivative thereof, with said first electronic message; and upon generation of a response message to said first electronic message by said at least one mail client, including any response text generated by said one first agent in respect of said first electronic message and any response text included in said returned second electronic message, or derivative thereof, in said response message.

22. An electronic message processing system for sending and receiving electronic messages across a network, the electronic message processing system including:

a classification module, arranged to cause said received electronic messages to be analyzed in order to determine how said received electronic messages are routed within the electronic processing system, and to assign to said received electronic messages respective routing information;

a distribution module, arranged to distribute said received electronic messages amongst a plurality of first agents depending on the respective routing information associated with each message;

storage means, arranged to store received electronic messages in association with respective means for uniquely identifying each received message; and at least one mail client, arranged to render to one or more of said first agents electronic messages distributed thereto in order that said one or more first agents may prepare an appropriate response message to at least part of an electronic message rendered thereto, each mail client including:

means, responsive to an input from one of said first agents in respect of a first rendered message, for causing a second electronic message to be generated, said second electronic message being other than a response message to said rendered first electronic message and including at east part of said first electronic message and any appropriate response prepared by said one or more first agents;

means for generating a routing tag, which routing tag includes the respective unique message identifying means associated with said first electronic message, wherein the mail client is arranged to cause said routing tag to be included in said second electronic message;

the classification module being arranged, upon receipt of an electronic message comprising at least one of said routing tags, to associate, by means of said respective unique message identifier included in said at least one routing tag, the received electronic message with said first electronic message stored in said storage means, and wherein the association between the received electronic message and the first electronic message stored in said storage means causes, upon generation of a response message to said first electronic message by said at least one mail client, any response text generated by said one first agent in respect of said first electronic message and any response text included in said received electronic message to be included in said response message.

23. In an electronic message processing system for sending and receiving electronic messages across a network, the electronic message processing system being arranged to store received electronic messages in association with respective means for uniquely identifying each received message and to distribute received electronic messages amongst a plurality of first agents, a method of processing received electronic messages, the method comprising:

rendering to one of said first agents a first electronic message in order that said first agent may prepare an appropriate response to at least part of the rendered electronic message;

causing a second electronic message to be generated, said second electronic message being other than a response message to said rendered first electronic message and including at least part of said first electronic message and any appropriate response prepared by said one or more first agents;

generating a routing tag, which routing tag includes the respective unique message identifying means associated with said first electronic message;

causing said routing tag to be included in said second electronic message;

associating, upon receipt of an electronic message comprising at least one of said routing tags, by means of said respective unique message identifier included in said at least one routing tag, the received electronic message with said first electronic message; and upon generation of a response message to said first electronic message by said at least one mail client, including any response text generated by said one first agent in respect of said first electronic message and any response text included in said received electronic message in said response message.

* * * * *